United States Patent [19]

Mehta et al.

[11] 4,070,315

[45] Jan. 24, 1978

[54] BENTONITE/HALOGEN FLAME RETARDING ADDITIVE

[75] Inventors: Ram K. S. Mehta, Troy; Philip Weiss, Birmingham, both of Mich.

[73] Assignee: General Motors Corporation, Detroit, Mich.

[21] Appl. No.: 676,154

[22] Filed: Apr. 12, 1976

[51] Int. Cl.² .................................................. C08L 91/00
[52] U.S. Cl. ........................... 260/28.5 B; 252/8.1; 260/45.7 R; 260/45.8 A; 260/45.95 H; 260/45.95 R; 260/876 R; 260/889; 260/891; 260/42.47
[58] Field of Search ............... 260/28.5 B, 45.7 R, 260/45.8 A, 45.95 H, 45.95 R, 876 R, 891, 889, 42.47; 252/8.1

[56] References Cited

U.S. PATENT DOCUMENTS

| | | | |
|---|---|---|---|
| 3,516,959 | 6/1970 | Jonas | 260/28 |
| 3,766,189 | 10/1973 | Blackford, Jr. | 260/28.5 B |
| 3,847,723 | 11/1974 | Babayan | 260/28.5 B |

OTHER PUBLICATIONS

Kirk–Othmer, Encyclopedia of Chemical Technology, 2nd Ed., vol. 3, p. 357.

*Primary Examiner*—Melvyn I. Marquis
*Attorney, Agent, or Firm*—Jack I. Pulley

[57] ABSTRACT

In accordance with a preferred embodiment of this invention, a fire resistant acrylonitrile-butadiene-styrene (ABS) copolymer composition is provided. The fire retarding additive used in this composition is a combination of magnesium bentonite and a compatible halogenated organic compound of the type that can be used in combination with an antimony containing compound to form a synergistic fire retarding additive for polymer compositions.

4 Claims, No Drawings

BENTONITE/HALOGEN FLAME RETARDING ADDITIVE

FIELD OF THE INVENTION

This invention relates to a fire retarding additive suitable for use in organic polymers; and more specifically to an effective fire retarding additive that does not contain antimony.

BACKGROUND OF THE INVENTION

During the Second World War the antimony-halogen fire retarding synergism was discovered, and a wide variety of fire retarding additives have been developed using this basic principle. There are, however, several problems associated with the use of antimony compounds. One major problem is that the United States must import practically all of the antimony oxide that it needs and both supply and price have proved unpredictable.

OBJECTS OF THE INVENTION

This invention provides a fire resistant ABS resin which contains a fire retarding additive formed by substituting a bentonite clay, having an exchangeable cation selected from alkali metals, alkaline earth metals and hydrogen for the antimony compound in the conventional antimony-halogen fire retarding additive combination, and a method of forming the resin.

This invention also provides a fire resistant ABS resin having a fire retarding additive combination formed by substituting hydrogen bentonite and/or the ion exchange reaction product of an inorganic alkali metal salt or alkaline earth metal salt and a bentonite clay for the antimony compound in the conventional antimony-halogen fire retarding additive combination, and a method of forming the resin.

This invention also provides a fire resistant ABS composition containing a fire retarding additive combination formed by substituting magnesium bentonite and/or hydrogen bentonite for the antimony compound in the conventional antimony-halogen fire retarding additive combination, and a method of forming the resin.

This invention further provides a fire retarding additive combination suitable for use in organic polymers particularly ABS wherein the additive is a blend of a bentonite clay having an exchangeable inorganic elemental cation such as hydrogen, alkali metals and alkaline earth metals, and a halogenated organic compound which when dispersed in an organic polymer and combusted will produce a hydrogen halide.

This invention further provides a fire retarding additive combination suitable for use in organic polymer compositions comprising magnesium bentonite and a halogenated organic compound which when dispersed in an organic polymer and combusted will produce a hydrogen halide.

This invention still further provides an inexpensive but effective substitute for antimony oxide in the well-known fire retarding synergistic composition of antimony oxide and a halogenated organic compound; this substitute is magnesium bentonite and/or hydrogen bentonite.

SUMMARY OF THE INVENTION

In accordance with a preferred embodiment of this invention a fire resistant ABS resin is provided. A novel fire retarding additive improves the resin's resistance to fire. The preferred additive consists of the combination of magnesium bentonite and a halogenated organic compound which when dispersed in the resin and combusted will yield a hydrogen halide. The preferred magnesium bentonite may be characterized as having at least about 2% by weight of an exchangeable magnesium cation, a volume swell in water of at least about 50% and a cation exchange capacity of at least about 50 milliequivalents per 100 grams. All suitable bentonites will have similar volume swells in water and ion exchange properties.

The preferred fire retarding additive may also be viewed as formed by substituting magnesium bentonite for the antimony containing compound in the conventional antimony-halogen synergistic fire retarding additive.

The subject fire retarding additive is one answer to an intensive search for possible alternatives to antimony-based fire retarding additives. This search has been spurred, not only by the aforementioned supply and price problems, but also by problems in dispersing antimony oxide evenly throughout a polymer composition. Comparatively, the clay ingredient promotes the dispersability of the subject additive combination in organic polymers and is probably both non-polluting and nontoxic. In addition, if magnesium bentonite is used in combination with a chlorinated compound, such as Chlorowax ® or Chlorowax ® S70 (Diamond Shamrock Company), the combustion products should present no problem since the primary product is magnesium chloride. This compound has a boiling point about 1,400° C., a temperature which is not reached in most polymer fueled fires.

These and other advantages of the subject invention will be more easily understood in view of a detailed description thereof to include specific examples.

DETAILED DESCRIPTION OF THE INVENTION

EXAMPLE I

In accordance with the practice of this invention, the subject fire resistant ABS composition was prepared by first forming magnesium bentonite and then uniformly blending the bentonite and Chlorowax ®, a chlorinated paraffin, into an ABS resin.

The magnesium bentonite was formed by first dissolving about 9.6 grams of magnesium chloride (a magnesium salt) in about 100 milliters of distilled water. As this solution was stirred in a Waring blender, about 100 grams of a sodium bentonite marketed by the Georgia Kaolin Corporation under the tradename Thixo-Jell #1 was added. A slurry formed within about a minute and started to thicken. After 2 minutes the stirring was stopped and the contents were allowed to stand for about 2 hours. The product was then transferred to a shallow pan, freeze-dried and powdered to about 100 mesh size.

Thermogravimetric analysis of the magnesium bentonite showed that the material was hydrated. It had retained an overall moisture content of about 15% by weight and this water was given off gradually as the temperature increased. It continued to be released until the temperature of the sample was about 700° C., a temperature well above the temperature of most polymer fueled fires.

The ABS resin, marketed by the Marbon Chemical Company, was compounded with the magnesium bentonite and Chlorowax ® S70 on a Getty hot roll mill, and compression molded into slabs about a quarter inch thick. The slabs were then cut into bars having dimensions of 5" by 0.5" by 0.25", and the flammability tests were performed on these bars.

Two standard methods of testing flame retardant polymers were used. The first is the oxygen index test which is described in ASTM D-2863-74 and which measures the minimum percentage of oxygen necessary to support a flame on the sample. The other test was an internal Fisher Body test, TM 32–12, which is a slight modification of the flammability test described in Federal Motor Vehicle Safety Specification 302. In this test, the sample is held horizontally within a metal cabinet and exposed to a 1½ inch flame of a Bunsen burner. The burning is timed and reported in inches per minute.

Table I below shows the oxygen index and burn rate of several compositions prepared within the procedures described in this example.

TABLE I

| | Ingredients | Composition (parts by weight) | | |
|---|---|---|---|---|
| | | I | II | III |
| 1. | ABS resin | 112 | 112 | 112 |
| 2. | Magnesium Bentonite | — | 15 | — |
| 3. | Sodium Bentonite (Thixo-Jell #1) | — | — | 37 |
| 4. | Chlorowax S70 | — | 15 | — |
| | Oxygen index | 18.1 | 22.1 | 19.4 |
| | Burn rate (in./min.) | 2.0 | SE* | — |

*SE - Self-Extinguishing

The first ABS composition is the control which contains no fire retarding additive. The second composition contains fifteen parts of the magnesium bentonite and 15 parts of Chlorowax ®. In this composition, the oxygen index has increased by four points and the resin has become self-extinguishing. The third example is included to show the effect of a high concentration of the sodium bentonite on the fire resistance of a polymer sample.

EXAMPLE II

In accordance with the procedures put forth in Example I, an additional series of experiments were run using bentonite clays which contain various cations including hydrogen, alkali metals and alkaline earth metals. The hydrogen (H) bentonites and the calcium (Ca) bentonite were purchased from the Georgia Kaolin Company under the designations shown in Table II. The results which are put forth in Table II indicate that all six bentonite compositions in combination with Chlorowax ® significantly and unexpectedly increase the fire retardant properties of ABS resins. In addition, from this data, it is evident that certain bentonite compositions are more effective than others. In view of all six, however, it does not appear that there is a difference in kind but rather a difference in degree of effectiveness.

TABLE II

| Ingredients | Compositions in (parts by weight) | | | | | | | |
|---|---|---|---|---|---|---|---|---|
| ABS | 112 | 112 | 112 | 112 | 112 | 112 | 112 | 112 |
| Chlorowax | — | 15 | 15 | 15 | 15 | 15 | 15 | 15 |
| Mg Bentonite | — | — | 15 | — | — | — | — | — |
| H Bentonite (T-300) | — | — | — | 15 | — | — | — | — |
| H Bentonite (T-30) | — | — | — | — | 15 | — | — | — |
| Ca Bentonite (T-60) | — | — | — | — | — | 15 | — | — |
| Na Bentonite Thixo-Jell #1 | — | — | — | — | — | — | 15 | — |
| Sr Bentonite | — | — | — | — | — | — | — | 15 |
| LOI | 18.1 | 19.5 | 22.1 | 21.8 | 21.2 | 21.2 | 21.0 | 21.0 |

EXAMPLE III

In accordance with the procedures described above, a series of experiments were run to determine the effect of bentonite and chlorowax ® individually on the oxygen index of ABS. The results of this investigation are set out in Table III and from that it is evident that the combined effect of the hydrogen bentonite and Chlorowax ® is significantly greater than what one would expect by simply adding the increase provided by each ingredient individually. This set of experiments strongly suggests that a synergism is at work and clearly shows that the subject additive combination provides unexpected results.

TABLE III

| | Ingredient | Composition (parts by weight) | | | |
|---|---|---|---|---|---|
| | | I | II | III | IV |
| 1. | ABS | 112 | 112 | 112 | 112 |
| 2. | Hydrogen Bentonite (T-300) | — | 15 | — | 15 |
| 3. | Chlorowax S70 | — | — | 15 | 15 |
| | Oxygen index | 18.1 | 18.6 | 19.5 | 21.8 |
| | Individual contribution over the control | — | +0.5 | +1.4 | — |
| | Expected oxygen index if effects were cumulative | — | — | — | 20.0 |

In accordance with the practice of this invention, many organic polymers, and in particular the ABS resins, may be rendered less combustible by the addition of a fire retarding additive consisting essentially of a bentonite clay having an exchangeble monoatomic, elemental cation such as the alkali metals, alkaline earth metals and hydrogen, and a halogenated organic compound which when disposed in an organic polymer and thermally decomposed will yield a hydrogen halide.

The fire retarding effect of the subject additive is noticeable when the clay and the halogenated compound combination is present at about 3 to 5% by weight and increases directly as the concentration of the additive increases. Economically, it is best that the bentonite clay be present in as large a concentration as possible since it is the least expensive ingredient. That upper concentration limit may be defined at that point in which physical properties of the polymers deteriorate beyond the acceptable limits for any given application. Typically, the clay and the halogenated compound are present in about equal proportions. If the clay, however, is serving a dual purpose as both a filler and a fire retardant coagent, it may be present in quantities much greater than the halogenated compound depending on the desired physical properties of the resin and the particular degree of fire retardancy needed in a specific application.

The subject fire retarding additive composition has proved particularly effective in ABS compositions. The preferred ABS resins are formed by copolymerizing acrylonitrile, butadiene and styrene. Typically, the resin contains from about 15 to 25% by weight of the butadiene and the styrene and acrylonitrile are usually in a ratio of about 3 parts by weight styrene for each part of acrylonitrile. The relative proportion of each ingredient may be varied to control the physical and/or chemical properties of the copolymer. The subject additive has also proved effective in other polymer compositions to include polypropylene, polyesters, polyolefins, polyurethanes, nylon, and the like. Generally, the subject fire retarding additive is effective, to varying degrees, in most organic polymer compositions.

In describing those clays which are suitable in the subject invention, a problem of definition has arisen, since over the years several distinct systems have been devised to classify various clay compositions. For the purpose of this disclosure, the applicant has adopted that system proposed by R. E. Grim in a text entitled, "Clay Minerology," published by McGraw Hill, originally in 1953 and again in 1956. From the table which is reproduced below, taken from page 32 of the Grim text, it is evident that clays have in general been placed in two categories — amorphous and crystalline. Within the crystalline group, there are four subgroups, one of which (labelled B in the table) is the group of clays having a three-layer crystal structure. The two outer layers are silica tetrahedra and the middle layer is a dioctahedral or trioctahedral layer. Within group B, there is an additional classification of clays into two lower subgroups, those having an expanding lattice structure and those having a nonexpanding lattice structure. Those crystalline clays having a three-layer expanding lattice structure are suitable for use in the subject invention.

TABLE IV

I. Amorphous
    Allophane group
II. Crystalline
    A. Two-layer type (sheet structures composed of units of one layer of silica tetrahedrons and one layer of alumina octahedrons)
        1. Equidimensional
            Kaolinite group
            Kaolinite, nacrite, etc.
        2. Elongate
            Halloysite group
    B. Three-layer types (sheet structures composed of two layers of silica tetrahedrons and one central dioctahedral or trioctahedral layer)
        1. Expanding lattice
            a. Equidimensional
                Montmorillonite group
                Montmorilonite, sauconite, etc.
                Vermiculite
            b. Elongate
                Montmorillonite group
                Nontronite, saponite, hectorite
        2. Nonexpanding lattice
            Illite group
    C. Regular mixed-layer types (ordered stacking of alternate layers of different types)
        Chlorite group
    D. Chain-structure types (hornblende-like chains of silica tetrahedrons linked together by octahedral groups of oxygens and hydroxyls containing Al and Mg atoms)
        Attapulgite
        Sepiolite
        Palygorskite Generally, the suitable clays are characterized by a colloidal particle size, a volume swell in water of at least about 50% and an ion exchange capacity of at least about 30 milliequivalents per 100 grams. These two properties allow the clays to expand in the presence of water and the other polar solvents and to freely undergo ion exchange reactions with dissociated salts.

For the purposes of this disclosure, the term bentonite will be used to designate that group of clays having the three-layer expanding lattice structure and having various metal cations. R. E. Grim refers to most of these clays as smectite. Generally, any clay having this structure is suitable if they have the aforementioned water sorption and ion exchange properties. Suitable clays also include the ion exchange reaction product derived by treating, typically in an aqueous solution, a clay having the three-layer expanding lattice structure with a dissociated inorganic salt or an inorganic acid. By this type of treatment, it is possible to exchange the elemental cations of the salt or the hydrogen cation of the acid for the exchangeable cation in the clay and produce a suitable bentonite.

The basic fire retarding mechanism of the subject additive is believed to be a combination of one similar to that of the antimony-halogen fire retarding combination plus the effect of the water sorbed by the clay. In accordance with the subject invention the new fire retarding additive is formed by substituting the subject clay component for the prior antimony containing compound which was typically antimony oxide or antimony chloride. In the prior art antimony-halogen synergism, any halogen-containing compound which in combustion yields a hydrogen halide is suitable. This general statement may be found in many different texts including an article written by James J. Pitts, published in the Journal of Fire and Flammability, Volume 3, January, 1972, and entitled "Antimony-Halogen Synergistic Reactions in Fire Retardants" (see page 30). It is believed that any halogenated compound which is useful in the antimony based additive would also be useful in the subject fire retarding additive combination. In general, the brominated or chlorinated compounds containing at least 35% by weight of the halogen are preferred. More specifically, suitable halogenated compounds would include the chlorinated paraffins, such as Chlorowax S70 (marketed by Diamond Shamrock Company) which contains about 70% by weight chlorine, and various other aromatic, aliphatic and alicyclic halogenated compounds such as tribromophenol, tetrabromobisphenol, and others such as the following: hexachloroethane, polyvinyl chloride, chlorinated polyethylene perchloropentacyclodecane (dechlorane), chlorinated biphenyl, tetrachlorophthalic anhydride (TCPA), chlorendic anhydride, pentabromotoluene, hexabromobiphenyl, tetrabromophthalic anhydride (TBPA). Suitable compounds may also contain various functionalities as long as they are compatible with the clay, with the base resin and with any other additives which may be present.

While our invention has been described in terms of certain specific embodiments, it will be appreciated that other forms thereof could readily be adapted by one skilled in the art. Therefore, the scope of our invention is not to be limited to the specific embodiments disclosed.

The embodiments of the invention in which an exclusive property or privilege is claimed are defined as follows:

1. A fire retardant composition comprising a uniform blend of an ABS resin and at least about 3 to 5% by weight of said resin of a synergistic fire retardant additive combination consisting essentially of
    a bentonite clay taken from the group consisting of hydrogen bentonite, alkali metal bentonites and alkaline earth metal bentonites, said clay having a volume swell in water of at least about 50% and a cation exchange capacity of at least about 30 milliequivalents per 100 grams; and a halogenated aliphatic, aromatic, or alicyclic compound, said additive combination containing at least as many parts by weight of said bentonite clay as said halogenated aliphatic, aromatic or alicyclic compound.

2. A fire retardant composition comprising a uniform blend of an ABS resin and at least about 3 to 5% by weight of said resin of a synergistic fire retardant additive combination consisting essentially of a bentonite clay selected from the group consisting of magnesium bentonite and hydrogen bentonite; and a halogenated aliphatic, aromatic, or alicyclic compound, said additive combination containing at least as many parts by weight of said bentonite clay as said halogenated aliphatic, aromatic, or alicyclic compound.

3. In a fire resistant composition comprising a uniform blend of an ABS copolymer and a synergistic fire retarding additive combination the improvement comprising as the synergistic fire retarding additive combination a mixture present in at least about 3 to 5% by weight of a bentonite clay selected from the group consisting of hydrogen bentonite, an alkali metal bentonite and an alkaline earth metal bentonite, said clay having a volume swell in water of at least about 50% and a cation exchange capacity of at least about 30 milliequivalents per 100 grams; and a halogenated aliphatic, aromatic, or alicyclic compound, said mixture containing at least as many parts by weight of said bentonite clay as said halogenated aliphatic, aromatic or alicyclic compound.

4. In a fire resistant composition comprising a uniform blend of an ABS copolymer and a synergistic fire retarding additive combination the improvement comprising as the synergistic fire retarding additive combination a mixture present in at least about 3 to 5% by weight of a bentonite clay selected from the group consisting of hydrogen bentonite, an alkali metal bentonite and an alkaline earth metal bentonite, said clay having a volume swell in water of at least about 50% and a cation exchange capacity of at least about 30 milliequivalents per 100 grams, and a halogenated organic compound having at least 35% by weight of a halogen selected from the group consisting of chlorine and bromine, and said halogenated compound being of the type suitable for use with antimony oxide to form a synergistic fire retardant additive for use in organic polymer compositions, said mixture containing at least as many parts by weight of said bentonite clay as said halogenated organic compound.

* * * * *